United States Patent
Smit

(10) Patent No.: US 7,248,179 B2
(45) Date of Patent: Jul. 24, 2007

(54) ELECTRONIC METER READER SYSTEM AND METHOD

(76) Inventor: Daniël Smit, PO Box 757, Zeerust (ZA) 2865

( * ) Notice: Subject to any disclaimer, the term of this patent is extended or adjusted under 35 U.S.C. 154(b) by 227 days.

(21) Appl. No.: 10/489,217

(22) PCT Filed: Sep. 12, 2002

(86) PCT No.: PCT/ZA02/00139

§ 371 (c)(1), (2), (4) Date: Jul. 22, 2004

(87) PCT Pub. No.: WO03/023415

PCT Pub. Date: Mar. 20, 2003

(65) Prior Publication Data

US 2005/0012639 A1    Jan. 20, 2005

(30) Foreign Application Priority Data

Sep. 12, 2001   (ZA) ..................................... 01/7524

(51) Int. Cl.
*G08B 23/00* (2006.01)
(52) U.S. Cl. ............................ 340/870.02; 340/870.03; 340/870.07; 705/412

(58) Field of Classification Search ........... 340/870.02, 340/870.03, 870.07; 705/412; 379/106.03
See application file for complete search history.

(56) References Cited

U.S. PATENT DOCUMENTS 4,803,632 A * 2/1989 Frew et al. .................. 705/412
6,014,089 A * 1/2000 Tracy et al. ........... 340/870.02

FOREIGN PATENT DOCUMENTS

| EP | 0 834 849 A | 4/1998 |
| GB | 2 325 589 A | 11/1998 |
| GB | 2 335 523 A | 9/1999 |

* cited by examiner

*Primary Examiner*—Albert K. Wong
(74) *Attorney, Agent, or Firm*—Nixon & Vanderhye P.C.

(57) ABSTRACT

A utility metering system includes a plurality of distributed utility meter readers. Each reader is associated with a respective electronic utility meter at a respective utility user station. Each meter reader comprises a transceiver for transmitting metered data received from the respective meter to a remote station via a GSM cellular infrastructure in the form of an SMS message. The data received is stored in a database in relation to a unique identification code number. In the case of meters for pre-paid utilities, the system enables users to obtain credit readings from the station from positions remote from the meters and also to replenish credits on the meters from such positions, by causing the station to transmit credit data prepaid for via the infrastructure to the meters.

15 Claims, 2 Drawing Sheets

US 7,248,179 B2

ELECTRONIC METER READER SYSTEM AND METHOD

This application is the US national phase of international application PCT/ZA02/00139, filed in English on 12 Sep. 2002, which designated the US. PCT/ZA02/00139 claims priority to ZA Application No. 2001/7524 filed 12 Sep. 2001. The entire contents of these applications are incorporated herein by reference.

TECHNICAL FIELD

This invention relates to utility, such as electricity, supply and monitoring systems and methods.

Conventionally, supply of electricity to a user station, such as a domestic house, is measured by a rotary disc meter which is periodically and visually read by a human meter reader, to prepare accounts for payment by the user, for use during a period in the past. Prepaid systems are also known where no human meter reader is required, but where the user pays in advance for a quantum of electricity to be used in future. A problem with both these systems is that the user cannot read the meter at the user station from a remote location. Furthermore, a major disadvantage of the aforementioned conventional systems is that it involves the unnecessary expense of human meter readers and the problems associated therewith, such as time delays, difficult accessibility to the meters and inaccuracies. A problem with the prepaid systems is that it is inconvenient, if possible, to recharge the meter with a further quantum without direct user access to the meter.

OBJECT OF THE INVENTION

Accordingly it is an object of the present invention to provide a system and method with which the applicant believes the aforementioned disadvantages will at least be alleviated.

SUMMARY OF THE INVENTION

According to the invention, a utility meter reading system comprises a plurality of distributed electronic meter readers each associated with a respective utility meter, each meter reader comprising telecommunications means for transmitting metered data received from a respective utility meter to a remote station.

Each of the respective utility meters is preferably an electronic meter. Each meter reader is preferably in data communication with the respective utility meter.

The telecommunications means may comprise a radio frequency transceiver.

The transceiver may utilize a cellular phone infrastructure to transmit the data to the remote station.

The transceiver may transmit the metered data in the form of an SMS message.

The remote station may comprise a computer system and database, the database being configured to store metered data for each reader in relation to a unique identification code associated with the reader.

Each of the meter readers may intermittently transmit to the remote station metered data to be stored in the database.

Alternatively of an addition the remote station may intermittently poll each of the utility meter readers for metered data to be stored in the database.

The remote station, may further comprise a caller interface which is contactable by a calling user and for automatically providing the user with data from the database.

The caller interface may be configured to receive credit data from the calling user and to transmit said data to a calling user nominated utility meter via the cellular infrastructure.

The caller interface may comprise an interactive voice front-end for cooperating with the calling user.

Also included within the scope of the present invention is an electronic meter reader for a utility meter, the meter reader comprising:

an interface mountable at the meter for receiving metered data from the meter; and telecommunications means for transmitting the received metered data to a remote destination.

The meter is preferably an electronic meter and the meter reader may be connectable to the meter via a suitable interface, to be in data communication therewith.

The telecommunications means may comprise a cellular communications transceiver device which is associated with a unique number.

The metered data may be one of past consumption data and available prepaid credit data.

Yet further included within the scope of the present invention is a method of reading a utility meter, the method comprising the steps of:

electrically receiving metered data from the meter; and
transmitting the metered data to a remote station via a wireless telecommunications link.

The data may be transmitted in the form of a short message service (SMS) data message via a cellular infrastructure.

The data may periodically and automatically be transmitted to the remote station.

Alternatively or in addition the remote station may intermittently poll for the data to be transmitted to the station.

The invention further includes within its scope a meter reading service provider station and utility vending station as herein defined and described.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
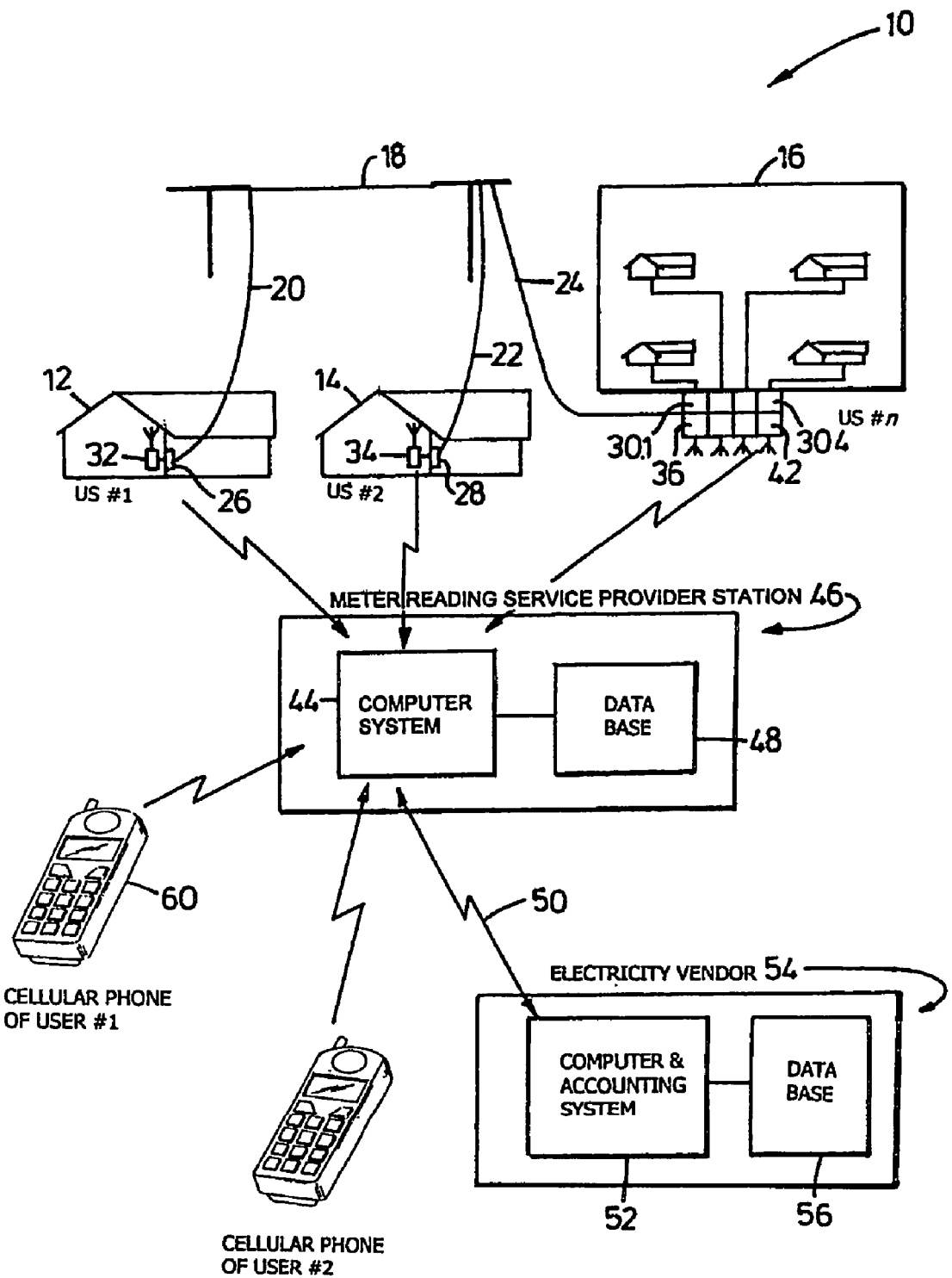
FIG. 1 is a block diagram of the system according to the invention.

A utility meter reading system according to the invention is generally designated by the reference numeral 10 in the figures.

Figure 2:
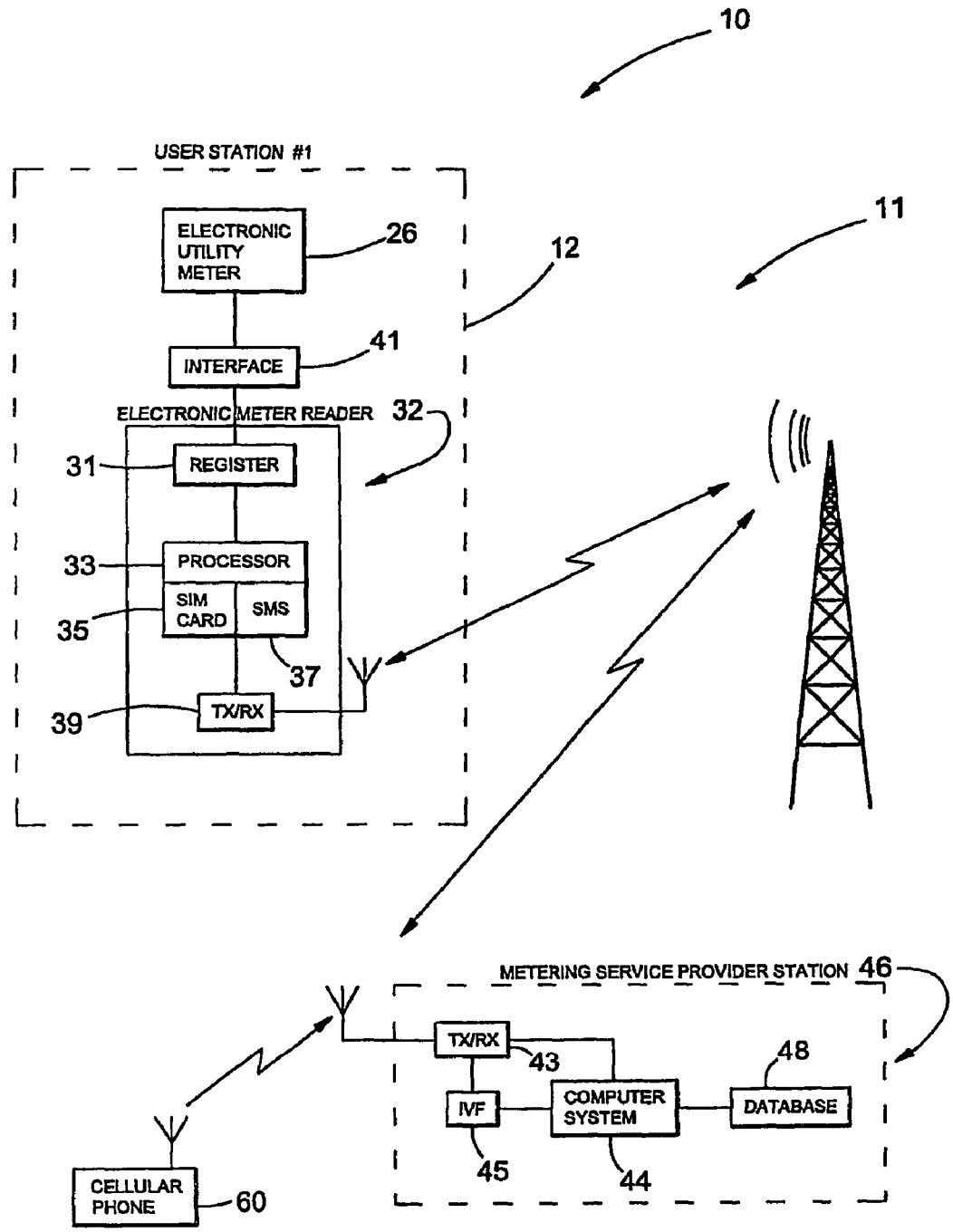
FIG. 2 is a more detailed block diagram of part of the system.

The system 10 is aimed amongst others to provide for more convenient reading of distributed utility metering apparatus and in the case of prepaid utilities, to provide for more convenient updating of utility credits stored in such metering apparatus. Although reference is made to electricity only in the following description, the system and method may also be utilized in relation to any other suitable vendible utility such as water, pay television, etc. The system is based on and piggy-backed on an existing cellular phone infrastructure 11 shown in FIG. 2, which may for example be GSM-based.

In FIG. 1 there are shown electricity user stations (US#1, US#2 to US#n) designated 12, 14 and 16 respectively. Each of these stations derive electrical power in conventional manner from a grid 18 by dedicated cables 20, 22 and 24 connected to a respective electronic electricity meter 26, 28 and 30.1 to 30.4 at the stations. Station US#n is a cluster housing complex, block of flats or other group of users all individually connected to respective meters 30.1 to 30.4 in a bank of meters located at a suitable central location. The meters are electronic meters and data generated and recorded thereby is available in digital format.

The system 10 comprises for each of said meters a respective associated electronic meter reader 32, 34 and 36 to 42. The meter readers are similar in configuration and therefore only meter reader 32, which is shown in more detail in FIG. 2, will be described in more detail. The reader 32 comprises a data register 31, a processor 33 cooperating with a SIM card 35 associated with a unique access or ID number and supporting a short message service (SMS) 37. The processor is connected to a bidirectional data communications device, such as a known transceiver 39 of a known cellular telephone. The electronic meter reader 32 is in data communication with its respective associated electronic meter 26 via a suitable data communications interface 41.

The system 10 further comprises a metering service provider station 46 which is connectable to any of the aforementioned meter readers 32, 34 and 36 to 42 via the known cellular telephone infrastructure 11. The service provider station 46 comprises a transceiver 43 cooperating with the cellular infrastructure 11 and a computer system 44 which cooperates with a local or remote database 48. The station 46 further comprises a caller interface or call center comprising an interactive voice front-end (IVF) 45. In the database 48 provision is made for storage and updating of data relating to user station identification data (ID), such as the aforementioned unique number of the abovementioned SIM card forming part of the respective electronic meter reader associated with the user station against data relating to past utility consumption or utility credit still available. The consumption and/or credit data may be recorded in any suitable form, such as a monetary value or in terms of units of electricity.

As shown in FIG. 1, the station 46 is also connectable via the cellular telephone infrastructure or any other suitable data transmission infrastructure 50, such as the internet, to a computer system 52 of a vendor 54 of electricity to the user stations US#1, US#2 . . . US#n. Such a vendor may be a municipality, local authority or the like. The computer system 52 preferably comprises an accounting system and is connected to a database 56 of the vendor.

Each electronic meter reader 32 to 42 is programmed intermittently, preferably automatically and periodically to read consumption or credit data from its respective associated meter 26, 28 and 30.1 to 30.4, to format the data in an SMS-message and to transmit the message via the cellular telephone infrastructure to the service provider station 46. The service provider station 46 stores the data received in the database 48 against the aforementioned user station identification data. In this manner the data in the database 48 is periodically updated. In other embodiments the station 46 may intermittently or periodically poll the electronic meter readers for current consumption and/or credit data. The data is then transmitted by the meter reader via the infrastructure 11 to the station 46 as herebefore described.

To obtain updated consumption or credit data, a user may call into service provider station 46 from any location, including remote locations via a cellular phone 60 and the cellular network, alternatively a landline system. The IVF 45 may then communicate with the calling user and upon receipt of the relevant ID code, provide in real time the latest updated consumption or credit data stored in the database 48 for the relevant user station. The service provider station 46 may alternatively be programmed intermittently and automatically to send a SMS message comprising the data to a user's nominated portable cellular phone.

Past use may be paid for by the user, by calling into the service provider station 46, and providing the ID code associated with the meter reader together with payment details, such as credit card or bank account details. This data is conveyed to the vendor in any suitable manner. In prepaid systems, this system may also be utilized to increase the credit stored locally in the relevant meter at the user station in accordance with a user's instructions and the necessary funds transfer may be initiated from a bank account of the user to that of the vendor 54. This transaction may for example be performed by the user purchasing from an authorized vending station (not shown) a so-called "scratch card" embodying in a number carried thereby, a quantum of electricity pre-paid for. Thus number is communicated in conjunction with the ID code to the service provider station 46 and/or vendor 54 to increment the credit stored in the relevant prepaid meter 26, 28 and 30.1 to 30.4, typically by transmitting the credit data to the meter utilizing the cellular phone infrastructure. The credit data received is then added to the existing credit data stored by the meter.

Consumption data for all users supplied by vendor 54 may also be downloaded to or polled by vendor 54. This downloaded consumption data may be utilized by the computer and accounting system 52 of vendor 54 to print consumption accounts for each of the user stations.

These accounts may then be mailed or transmitted electrically to the users associated with the user stations.

It will be appreciated that the method and system provide for an easy and convenient manner of reading meters at a plurality of distributed user stations. It will further be appreciated that the method and system enable a user to pay for past use or increase his credit of prepaid electricity in a convenient manner.

The invention claimed is:

1. A utility meter reading system comprising a plurality of distributed electronic meter readers each associated with a respective utility meter installed at a respective utility user station, each of the meter readers being connectable to a meter reading arrangement by a cellular phone infrastructure for intermittently transmitting respective metered data to the meter reading arrangement, the meter reading arrangement comprising a plurality of user portable cellular phones for receiving metered data and for communicating the data to a user, wherein at least some of the meters are prepayment meters storing credit data relating to the utility prepaid for by a user, and wherein the user is enabled selectively to increment the credit data stored in a selected meter utilizing the cellular phone infrastructure and one of said cellular phones.

2. A meter reading system as claimed in claim 1 wherein each meter reader is in data communication with the respective utility meter.

3. A meter reading system as claimed in claim 1 wherein each reader transmits the metered data in the form of an SMS message.

4. A meter reading system as claimed in claim 1 wherein the meter reading arrangement comprises a remote station comprising a computer system and database, the database being configured to store respective metered data for each reader in relation to a unique identification code associated with an SIM card of the reader.

5. A meter reading system as claimed in claim 4 wherein each of the meter readers intermittently transmits to the remote station metered data to be stored in the database.

6. A meter reading system as claimed in claim 4 wherein the remote station intermittently polls each of the utility meter readers for metered data to be stored in the database.

7. A meter reading system as claimed in claim 4 wherein the remote station further comprises a caller interface which is contactable by a calling user and for automatically providing the user with data from the database.

8. A meter reading system as claimed in claim 1 wherein the caller interface is configured to receive new credit data from the calling user and to transmit said new data to a prepaid utility meter nominated by the calling user and utilizing a unique identification code associated with an SIM card of the reader.

9. A meter reading system as claimed in claim 7 wherein the caller interface comprises an interactive voice front-end for cooperating with the calling user.

10. A method of communicating with a prepayment utility meter, the method comprising the steps of:

causing metered data to be transmitted via a cellular phone infrastructure;

causing the data to be communicated to a user via a cellular phone connectable to the infrastructure, and enabling the user to adjust credit data stored in the meter by causing data relating to a new credit for use of the utility prepaid for, to be transmitted from the cellular phone via the infrastructure to the meter.

11. A method as claimed in claim 10 wherein the metered data is transmitted in the form of a short message service (SMS) data message via the cellular phone infrastructure to a central station and then to said cellular phone.

12. A method as claimed in claim 11 wherein the metered data is periodically and automatically transmitted to the central station.

13. A method as claimed in claim 11 wherein the central station intermittently polls for the metered data to be transmitted to the station.

14. A method as claimed in claim 11 wherein the cellular phone is used to call the central station to retrieve the metered data.

15. A method as claimed in claim 10 wherein the new credit data is transmitted from the central station to the meter.

* * * * *